United States Patent
Pilard et al.

(10) Patent No.: US 7,983,129 B2
(45) Date of Patent: Jul. 19, 2011

(54) HIGH DATA CAPACITY STORAGE MEDIUM WITH PROTECTION CODE, METHOD FOR OBTAINING THE PROTECTION CODE AND RESPECTIVE DATA READING APPARATUS

(75) Inventors: Gael Pilard, Moenchweiler (DE); Frank Pizygodda, Villingen-Schwenningen (DE); Christophe Fery, Niedereschach (DE)

(73) Assignee: Thomas Licensing, Boulogne-Billancourt (FR)

( * ) Notice: Subject to any disclaimer, the term of this patent is extended or adjusted under 35 U.S.C. 154(b) by 218 days.

(21) Appl. No.: 12/455,699

(22) Filed: Jun. 5, 2009

(65) Prior Publication Data
US 2009/0310456 A1 Dec. 17, 2009

(30) Foreign Application Priority Data
Jun. 16, 2008 (EP) ..................................... 08158329

(51) Int. Cl.
*G11B 7/00* (2006.01)
(52) U.S. Cl. ....................... 369/53.21; 369/283; 369/284
(58) Field of Classification Search .......................... None
See application file for complete search history.

(56) References Cited

U.S. PATENT DOCUMENTS 5,311,498 A * 5/1994 Horiguchi .................. 369/47.23
6,430,128 B1 8/2002 Kato et al.
2004/0004922 A1 * 1/2004 Selinfreund et al. ....... 369/53.21
2005/0007937 A1 1/2005 Mori et al.

FOREIGN PATENT DOCUMENTS

EP 1847989 10/2007
WO WO 2005/064601 7/2005

OTHER PUBLICATIONS

Search Report, Jul. 18, 2008.

* cited by examiner

*Primary Examiner* — Joseph Haley
(74) *Attorney, Agent, or Firm* — Robert D. Shedd; Harvey D. Fried; James McKenzie

(57) ABSTRACT

The optical storage medium comprises a substrate layer, and a data layer disposed on the substrate layer, the data layer comprising data being arranged in tracks as marks and spaces. A protection code is coded in one of the tracks or a part of a track which code comprises marks of a first size and marks of a smaller, second size. The marks of the second size have in particular a width being smaller than the width of the marks of the first size. To obtain the protection code, a method is used comprising the steps of reading a track or a part of a track with a first laser power for obtaining a first data signal, reading the same track or the same part of a track in another step with a second laser power being different from the first laser power for obtaining a second data signal, and calculating the protection code by taking into account the first and the second data signals. The protection code may be calculated for example by a microprocessor of a respective data reading apparatus.

15 Claims, 2 Drawing Sheets

HIGH DATA CAPACITY STORAGE MEDIUM WITH PROTECTION CODE, METHOD FOR OBTAINING THE PROTECTION CODE AND RESPECTIVE DATA READING APPARATUS

This application claims the benefit, under 35 U.S.C. §119, of European Patent Application No. 08158329.6 filed 16 Jun. 2008.

TECHNICAL FIELD OF THE INVENTION

The present invention relates to an optical storage medium comprising a substrate layer and a data layer with a pit structure or a mark/space structure arranged in tracks on the substrate layer and to a respective apparatus for reading of the data. The optical storage medium is in particular an optical disc comprising a read-only data layer as the data layer and a mask layer with a super-resolution near field structure for storing of data with a high data density.

BACKGROUND OF THE INVENTION

Optical storage media are media in which data are stored in an optically readable manner, for example by means of a laser and a photo-detector being integrated within a pickup. The photo-detector is used for detecting the reflected light of the laser beam when reading data from the storage medium. In the meanwhile a large variety of optical storage media are known, which are operated with different laser wavelength, and which have different sizes for providing storage capacities from below one Gigabyte up to 50 Gigabyte (GB). The formats include read-only formats, write-once optical media, as well as rewritable formats. Digital data are stored on these media along tracks in one or more layers of the media.

The storage medium with the highest data capacity is at present the Blu-ray disc (BD), which allows to store up to 50 GB on a dual layer disc. For reading and writing of a Blu-ray disc an optical pickup with a laser wavelength of 405 nm is used. On the Blu-ray disc a track pitch of 320 nm and a mark length from 2T to 8T and 9T is used, where T is the channel bit length, and which corresponds with a minimum mark length of 138-160 nm. Further information about the Blu-ray disc system is available for example from the Blu-ray group via internet: www.blu-raydisc.com.

New optical storage media with a super resolution near-field structure (Super-RENS) offer the possibility to increase the data density of the optical storage medium by a factor of two to four in one dimension as compared with the Blu-ray disc. This is possible by a so-called super resolution or Super-RENS layer, which is placed above a data layer of the optical storage medium, and which significantly reduces the effective size of a light spot used for reading from the optical storage medium. The Super-RENS layer is also called a mask layer because it is arranged above the data layer and for some specific materials only the high intensity center part of a laser beam can penetrate the mask layer. Further, materials can be used for the mask layer, which show a higher reflectivity in the center part of the focused laser beam, e.g. InSb shows this nonlinear optical property. It can be assumed that the super-resolution effect is in particular based on a non-linear effect of some specific materials. Therefore, the Super-RENS effect allows to record and read data stored in marks of an optical disc, which have a size below the resolution limit of an optical pickup used for reading or writing the data on the disc.

A super resolution near field technique for recording and retrieving small marks beyond the optical diffraction limit is described for example by Tominaga, Nakano and Atoda in "An approach for recording and readout beyond the diffraction limit with an Sb thin film", Applied Physics Letters, Vol. 73, No. 15, 12 Oct. 1998, which describe to use an Sb thin film as a super resolution layer.

A method for manufacturing of a master for an optical disc having marks of different widths is described for example in EP-A-0814464, which uses a laser providing a recording beam, and uses a modulator for varying the intensity of the recording beam for the production of the master. By providing a higher laser power for the shortest marks, the width of the shortest marks can be increased, to increase the legibility of the smallest width.

In "Random Signal Characteristics of Super Resolution Near Field Structure Read-Only Memory Disc", Kim et al., Japanese Journal of Applied Physics, Vol. 45, No. 2B, 2006, pp. 1374-1378, measurements are described for a Super-RENS read-only disc having tracks with round pits of a first width, and of respective read-only discs having tracks with pits of a larger width. CNR results in dependency of the readout power are presented for pits having a length of 173 nm and pit widths ranging from 170 nm to 415 nm. Also shown are simulations for optical discs having pits with a width ranging from 64 nm to 160 nm.

SUMMARY OF THE INVENTION

The optical storage medium comprises a substrate layer and data layer disposed on the substrate layer, the data layer comprising data being arranged in tracks as marks and spaces. The optical storage medium comprises a protection code coded in one of the tracks or a part of a track, which code comprises marks of a first size being readable with a first laser power and marks of a second size which are readable only with a second laser power being higher than the first laser power. The optical storage medium is for example a read-only optical disc comprising pressed pits as the marks, and the tracks are arranged in one or several spirals on the optical disc.

Because of the different size of the marks, when reading the protection code with the first laser powering a first step, a first data signal is obtained, which is different from a second data signal being read with the second laser power in another step, and the protection code can be calculated then by taking into account the first and the second data signal, for example by calculating a sum or a difference of the first and the second data signal. A protection code of this kind would be very difficult to copy, when the marks of the first size in particular have a larger width, and the marks of the second size have a smaller width, being so small, that they can be read only with the second, higher laser power, but not with the first laser power.

A protection code of this kind can be utilized advantageously for a high density optical storage medium comprising a mask layer with a non-linear material for providing a super-resolution effect, in particular with a super-resolution near-field structure being arranged between the data layer and a cover layer of the optical storage medium. The first laser power is then adjusted such, that the marks of the first size are clearly readable, but not the marks of the second size, by using a laser power which is below the threshold for providing the super-resolution near-field effect of the mask layer, and the second laser power is adjusted such to provide the super-resolution near-field effect for reading of the marks of the second, smaller size.

The protection code may include for example an information about the beginning of the user data of the optical storage medium, with the protection code being arranged at the beginning of the optical storage medium before the user data. The beginning of the data is usually the inner part in case of an optical disc. It would then not be possible for a user, to read the user data without the information about the beginning of the user data. In addition, a copy of the optical storage medium would be very difficult for a user, because commercial recorders do not allow to record marks having a different width on an optical storage medium.

An apparatus for reading an optical storage medium of this kind has to calculate therefore the protection code of the optical storage medium before an access to the user data of the optical storage medium is possible. For obtaining the protection code, the apparatus adjusts the laser power of a corresponding optical pickup to read the marks of the larger size only with a first laser power to obtain the first data signal, and reads in another step the same track or the same part of the track with a second laser power being higher than the first laser power to read the marks with the first width as well as a marks with the smaller width, for obtaining a second data signal being different from the first data signal. In a next step, the protection code is calculated by taking into account the first and the second data signal, for example by using a microprocessor of the apparatus.

BRIEF DESCRIPTION OF THE DRAWINGS

Preferred embodiments of the invention are explained now in more detail below by way of example with reference to schematic drawings, which show.

DETAILED DESCRIPTION OF PREFERRED EMBODIMENTS

Figure 1:
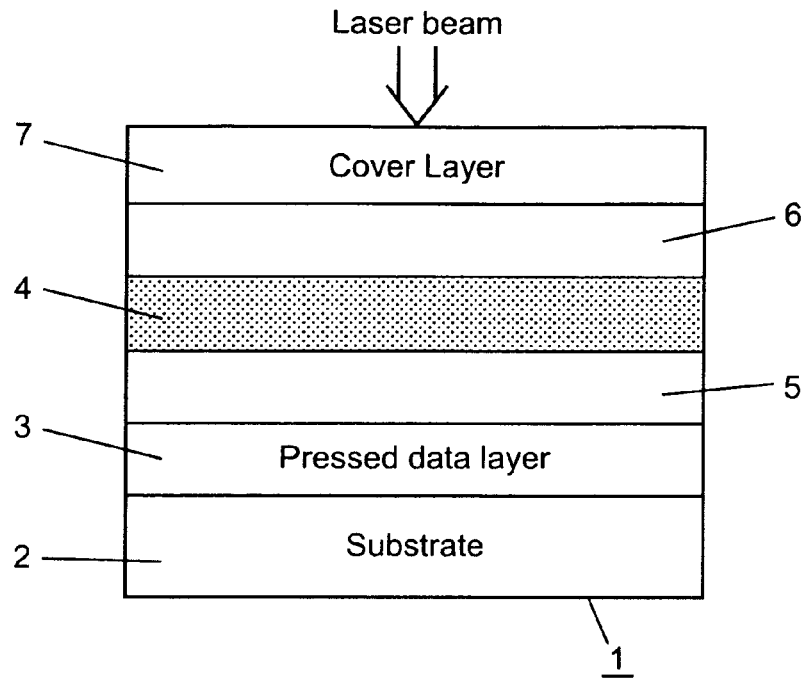
FIG. 1 in a cross section an optical storage medium comprising a mask layer for providing a super-resolution near-field effect, FIG. 2 a part of a track of the optical storage medium of FIG. 1 comprising marks with different widths, FIG. 3a a first data signal being obtained when reading the track of FIG. 2 with a low laser power, FIG. 3b a second data signal being obtained when reading the track of FIG. 2 with a second laser power being higher than the first laser power, FIG. 3c a third data signal being calculated from the first and the second data signal, FIG. 4 simulation results for a sequence of marks having a length of 150 nm as a function of the width and a first, lower laser power, and FIG. 5 simulation results for a sequence of marks having a length of 150 nm as a function of the width and with a second laser power providing a super resolution effect.

An optical storage medium 1 comprising a super-resolution near-field structure (Super-RENS) layer 4 is shown in a cross section in FIG. 1 in a simplified manner. The storage medium 1 comprises a substrate 2, on which a data layer 3 is arranged having a pressed pit structure, or alternatively, a mark/space structure. On the data layer 3 a first dielectric layer 5 is arranged as a protection layer. Also, a reflective metallic layer, not shown in FIG. 1, for example an aluminum layer, may be arranged between the dielectric layer 5 and the data layer 3. The Super-RENS layer 4 is also called a mask layer because it is arranged above the data layer 3 and for some specific materials only the high intensity center part of a laser beam can penetrate the Super-RENS layer 4. The optical storage medium 1 is in particular an optical disc having a size similar to DVDs and CDs.

The optical storage medium 1 comprises further a cover layer 7 as a protection of the storage medium 1 and advantageously also a second dielectric layer 6 arranged between the cover layer 7 and the Super-RENS layer 4. For reading the data of the data layer 3, a laser beam is applied to the top of the storage medium 1, penetrating first the cover layer 7. The first and second dielectric layers 5, 6 comprise for example the material $ZnS-SiO_2$. The substrate 2 and the cover layer 7 may consist of a plastic material, as known from DVDs and CDs. In other embodiments, the reflective metallic layer may be omitted, when a super-resolution near field structure is used, which does not provide an increase in transmittance due to a heating effect, but works with any other Super-RENS effect.

The optical storage medium 1 comprises in particular read only data arranged in essentially parallel tracks of the data layer 3. The read only data comprise for example user data and control data as known from prior art optical discs and are arranged in one or several spirals beginning at the inside and ending at the outside of the storage medium 1. According to the invention, the optical storage medium 1 comprises in addition a protection code coded in one of the tracks or a part of a track, as illustrated in FIG. 2.

Figure 2:
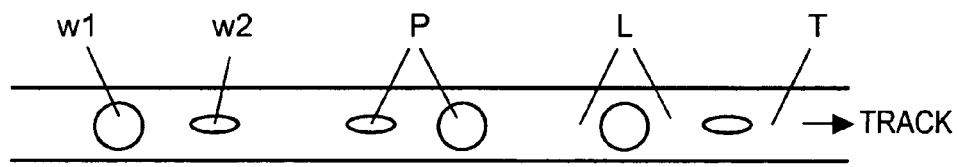

In FIG. 2, a part of a track T is shown, which comprises pits P separated by lands L representing coded digital data. The pits P have different sizes, in particular have a first width w1 and a smaller, second width w2. The pits having the width w1 are dimension such, that they are readable with an apparatus having an optical pickup with a blue laser having a wavelength and a laser power in accordance with Blu-ray disc standard requirements, for example a laser power of 0.4 mW at a speed of 5 m/s. This is a laser power which is not sufficient for providing a super-resolution near-field effect.

The second width w2 of the pits P is so much smaller, that they are not readable with the above laser power. To read the pits with the width w2, a second laser power is required sufficient for providing a super-resolution near-field effect, which is essentially higher than the first laser power, and is for example about 2.0 mW at a track speed of 5 m/s. This is a laser power which present optical pickups having a blue laser diode can easily provide. For the first laser power, in particular a laser power within a range of 0.1-1 mW may be used, and for the second laser power, a laser power within a range of 0.8-5 mW may be used.

Figure 3:
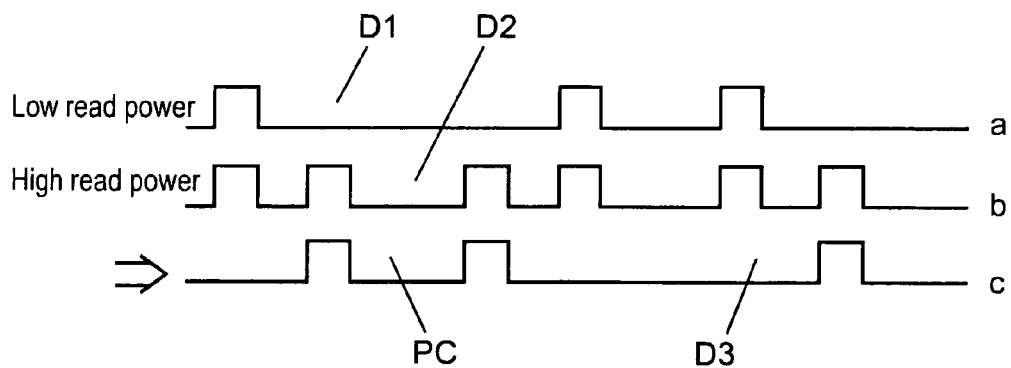

Therefore, when an apparatus for reading of the optical storage medium 1 reads the pits P of the track T with the first laser power, only the pits having the larger width w1 are detected, which leads to a data signal D1 as shown in FIG. 3a. When the apparatus reads the same part of the track T with the second laser power being sufficient for providing the super-resolution near-field effect, the pits P with the larger width w1 as well as the pits P with the smaller width w2 are detected, which results in a data signal as shown in FIG. 3b. A track T having pits of two different sizes w1 and w2, as described with regard to FIG. 2, provides therefore two different data signals D1, D2, when reading the track T with the first and the second laser power. This effect can be utilized for providing a protection code for the optical storage medium 1, by using a calculation, which takes into account the first and the second data signals D1, D2.

To access the protection code of the optical storage medium 1, an apparatus for reading of the optical storage medium uses therefore the first laser power in a first step for reading only the pits having the larger width w1 for obtaining the first data signal D1, FIG. 3a. In a second step, the apparatus reads the same track T or the same part of the track T with a second laser power being essentially higher than the first laser power for reading the pits P having the larger size w1 as well as the pits P having the smaller size w2 for obtaining the second data signal D2, FIG. 3b. The protection code is then calculated by using a combination of the two data signals D1, D2, which can be done for example by a microprocessor of the apparatus. For example, the protection code may be calculated by using the difference between the second data signal D2 and the first data signal D1, which leads to a third data signal D3, as shown in FIG. 3c. But any other mathematical calculation method may be used also for obtaining a protection code, for example an addition or a multiplication.

The protection code may be used advantageously for a read protection of an optical storage medium, to prevent the reading of user data for a not authorized person. The apparatus therefore may allow to read the user data of the optical disc only, when the protection code of the storage medium is in agreement with a protection code stored in a memory of the apparatus, or when a user inputs the correct protection code to the apparatus, for example by using a remote control.

The protection code may be arranged ahead of the user data at the beginning of the optical storage medium, for example at an inner section of a spiral of an optical disc, on which the tracks are arranged as one spiral beginning at the inside and ending at the outside of the optical disc. The protection code may include in particular the start location of the user data of the optical disc. The reading of the beginning of the user data would then not be possible therefore without knowing the protection code. The protection code may include alternatively or in addition also essential control data necessary for reading of the user data of the optical disc.

The protection code can be used also as a very effective copy protection for a read only optical storage medium, when using marks with a larger width w1 and marks with a smaller width w2, as described with regard to FIG. 2 and FIGS. 3a-3c. Current optical recorders can not record marks on an optical disc having alternatingly different width, as shown in FIG. 2. For recording marks of different width, the spot size of the recording laser light on the disc would have to be modulated in the width, for recording alternatingly marks of the first width w1 and the second width w2. This is with commercial equipment not possible.

Therefore, when reading just the raw data of the track containing the protection code as shown in FIG. 2, all the data can be read in one step by using the higher, second laser power for obtaining the data signal D2 as shown in FIG. 3b. It is therefore still possible to obtain the raw data of the optical storage medium for example by reading the complete optical disc with a higher laser power. But when that raw data is copied onto a recordable optical disc, the copied data signal D2 on the recordable optical disc results in a track having marks with always the same width, and therefore the protection code can not be obtained anymore from the copied disc, because the information for the first data signal D1 is lost.

Therefore, even when the correct protection code of the original optical storage medium is known, this protection code can not be used for reading of the copied data of the recorded optical disc, because when using the method for obtaining the protection code of the track designed for providing the protection code, the apparatus for reading of the optical disc does not obtain two different data signals D1, D2, when reading the track T with a low read power in a first step and with a high read power in a second step, because the copied track does not contain marks of different width, as contained on the original disc.

When designing or specifying a high data capacity optical disc utilizing a super resolution near field effect, which may be used as a future standardized optical storage medium, a very effective copy protection may be included, when including in a track or a part of a track marks having different width, as described with regard to FIG. 2.

An apparatus for reading of such a Super-RENS optical disc may include for example an optical pickup having a blue laser diode and a numerical aperture NA=0.85, similar as used for present Blu-ray Disc pickups. For the marks of the protection code then pressed pits could be used having a length of 150 nm and a width of 150 nm, having for example a round size as shown in FIG. 2. Pits P of the size w1 could be visible with a low read laser power, for example 0.4 mW, as described above. The pits P of the size w1 would then provide the first data signal D1, as shown in FIG. 3a. For the second width w2, a width of 120 nm or below can be used, which is below the optical resolution limit of optical pickups using a blue laser diode. The pits with the width w2 can be read then only with a higher laser power providing the super resolution effect of the Super-RENS disc, for example 2.0 mW, which results in the second data signal D2. For the calculation of the protection code, PC, the apparatus may utilize a microprocessor already available in the apparatus.

An optical pickup in agreement with the Blue-ray disc standard provides a spot size of 240 nm on the disc, which corresponds about with the optical resolution limit $\lambda/2*NA$ for this pickup. The corresponding cutoff frequency at a speed of 4.92 m/s is of 20.6 MHz and is related to a "space-mark" scheme of 240 nm. The minimum detectable pit size is reached for pits having a length of 120 nm. This is confirmed by experiments. In the same way, a pit having a length of 150 nm or below together with a width of 120 nm or below is not detectable without means like a super-resolution effect.

Figure 4:
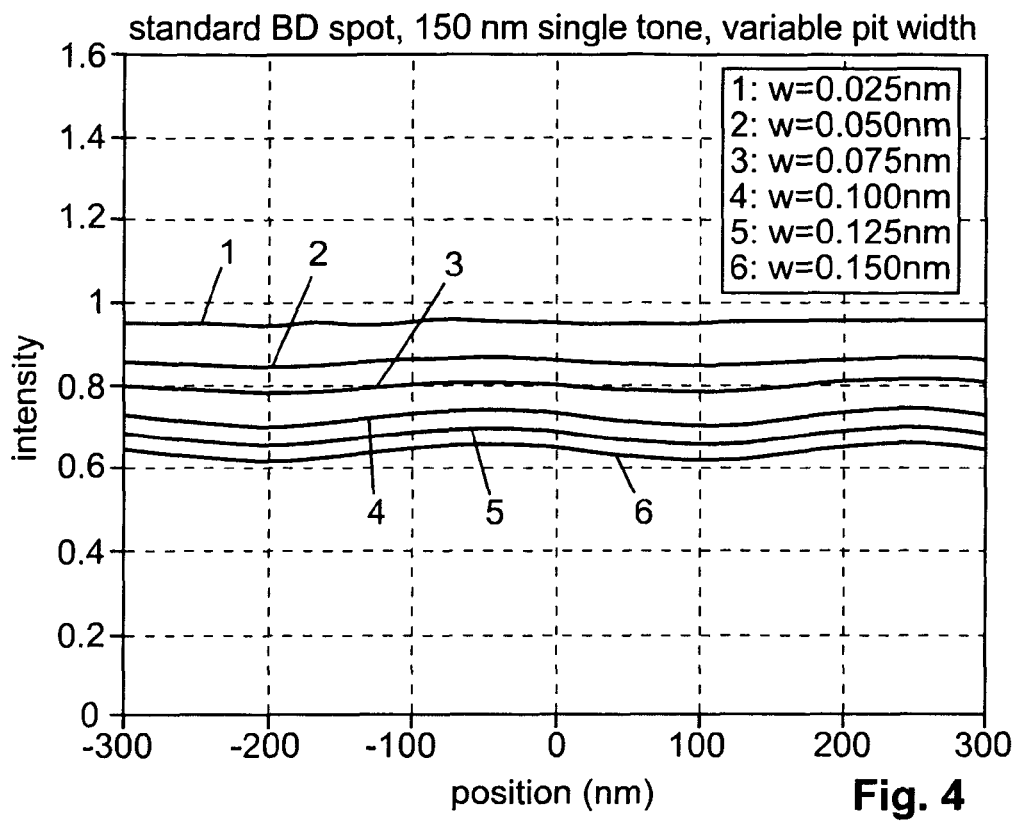

To provide a further prove, simulations have been made for the detection of pits, having a length of 150 nm and having different widths of 150 nm and smaller for a first laser power being not sufficient for providing a super resolution effect. Results of these simulations are shown in FIG. 4, which shows that pits having a width of 150 nm and slightly smaller would lead to a modulation of a read signal for the pits, which would allow the detection of these pits in accordance with the theory and experiments. However, for 150 nm pits having a width equal or below 120 nm, no sufficient modulation of the data signal would be obtained which such a laser power, preventing such marks to be detected.

Figure 5:
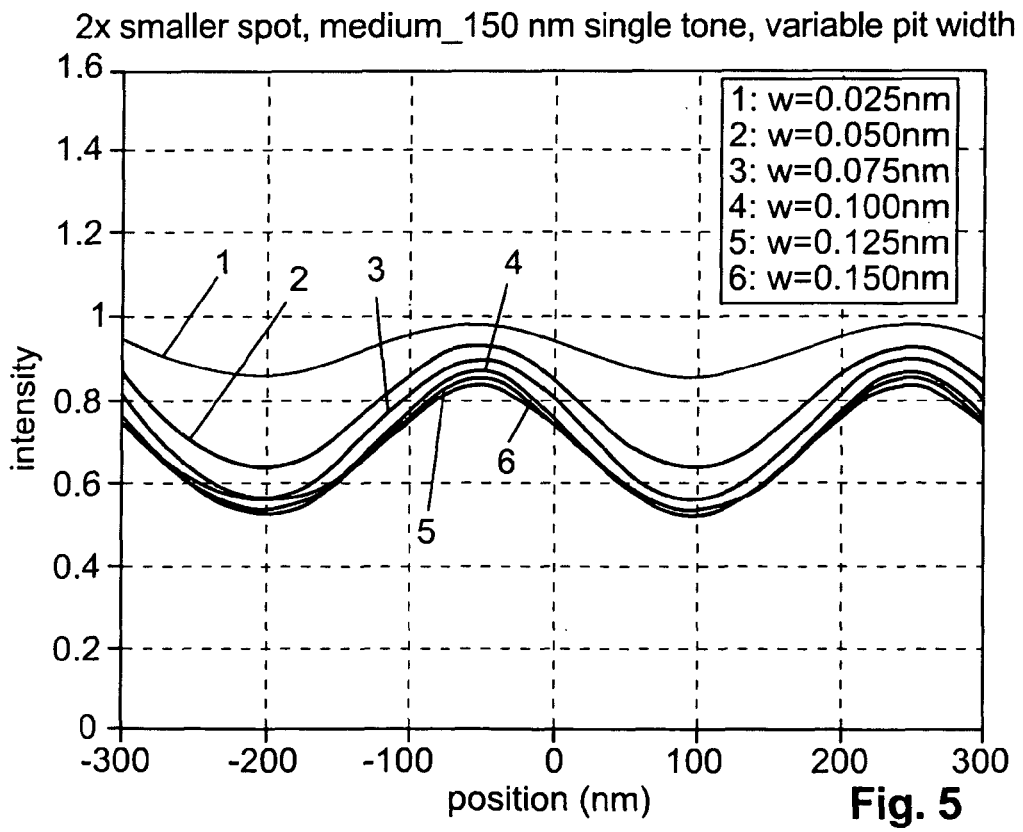

Further simulations have been made for the same pits, but using now a higher laser power being sufficient for providing a super resolution effect. The results of these simulations are shown in FIG. 5. As can be seen, for pits having a width even below 75 nm, a clear modulation of the data signal would be obtained.

The marks P as shown in FIG. 2 representing the protection code have all the same length. Alternatively, different lengths may be used for the marks having the first width, for the marks having the second width, or for both types of marks.

A read only optical disc having pits P of two different widths w1, w2 can be easily manufactured by using electron beam mastering for the production of a master for the optical disc. Electron beam mastering allows to wobble the electron beam in transverse direction with regard to the track direction, for providing a defined width of the pits of a track. The wobble amplitude for the electron beam can be easily modulated, for providing a sequence of pits having two different widths, as shown in FIG. 2. A master of this kind can be used then for pressing of the data layer of a respective read-only optical disc.

The protection code of this invention can be used therefore advantageously for a Super-RENS optical disc, comprising a mask layer having a super resolution near field structure, as described with regard to FIG. 1, but the invention may be utilized also for other optical discs or other optical storage media, for example holographic storage media. The invention may be used also not only for read only (ROM) optical storage media, but also for recordable optical storage media, for example to allow a user to record user-specific data on a recordable part of the optical storage medium. The apparatus for reading such a kind of optical storage media may utilize not only a laser diode providing a blue wavelength, but any other wavelength may be used as well. The invention therefore resides in the claims herein after appended.

The invention claimed is:

1. An optical storage medium comprising
a substrate layer, and
a data layer disposed on the substrate layer (2), the data layer (3) comprising data being arranged in tracks as marks and spaces, characterized in that
a protection code is coded in one of the tracks or a part of a track, which code comprises
marks of a first size being readable with a first laser power and
marks of a smaller, second size (w2) which are readable only with a second laser power being higher than the first laser power.

2. The optical storage medium of claim 1, wherein the marks of the second size have a width being smaller than the width of the marks of the first size.

3. The optical storage medium of claim 1, wherein the protection code of the optical storage medium is calculated by using a first data signal being read with the first laser power and a second data signal being read with the second laser power, the first data signal corresponding with the marks of the first size and the second data signal corresponding with the marks of the second size.

4. The optical storage medium of claim 1, comprising a cover layer and a mask layer with a non-linear material for providing a super-resolution effect, in particular with a super-resolution near-field structure arranged between the cover layer and the data layer.

5. The optical storage medium of claim 4, wherein the marks of the second size have a size being below the optical resolution limit and the marks of the first size have a size being above the optical resolution limit of an optical pickup designed for reading of the data of the optical storage medium, and wherein the first laser power is a laser power being below the threshold for providing a super-resolution near-field effect of the mask layer, and the second laser power is a laser power being above the threshold for providing a super-resolution effect of the mask layer.

6. The optical storage medium of claim 2, wherein the marks of the first and the second size have the same length.

7. The optical storage medium of claim 4, wherein the optical storage medium is a read-only optical disc comprising pressed pits as the marks, and wherein the protection code is usable for a copy protection or for a read protection of the optical disc.

8. A method for reading data from an optical storage medium comprising data being arranged in essentially parallel tracks, comprising the steps:
reading a track or a part of a track with a first laser power for obtaining a first data signal,
reading the same track or the same part of a track in another step with a second laser power being different from the first laser power for obtaining a second data signal being different from first data signal, and
calculating a protection code of the optical storage medium by taking into account the first and the second data signals.

9. The method of claim 8, with the step of using an optical pickup providing the same wavelength for both reading steps, and wherein the first and the second laser power are selected such that optical properties of the storage medium provide different first and second data signals.

10. The method of claim 9, wherein the first laser power is a laser power being below the threshold for utilizing a super-resolution effect of the storage medium and wherein the second laser power is a laser power being above the threshold for utilizing a super-resolution effect of the optical storage medium.

11. The method of claim 10, with the step of calculating the protection code by taking into account a difference or a sum of the first and the second data signal.

12. The method of claim 10, with the step of using the protection code for a copy protection or for a read protection of the optical storage medium.

13. The method of claim 8, wherein the optical storage medium is a storage medium in accordance with claim 1.

14. An apparatus comprising an optical pickup for reading data of an optical storage medium by utilizing a method in accordance with claim 8.

15. The apparatus of claim 14, comprising a microprocessor for the calculation of the protection code, and wherein the optical pickup comprises a laser diode with a wavelength in the range of 400-420 nm.

* * * * *